United States Patent [19]

Klees

[11] Patent Number: 4,802,629
[45] Date of Patent: Feb. 7, 1989

[54] PLUG-TYPE EXHAUST NOZZLE HAVING A VARIABLE CENTERBODY AND TRANSLATING SHROUD

[75] Inventor: Garry W. Klees, Mercer Island, Wash.

[73] Assignee: The Boeing Company, Seattle, Wash.

[21] Appl. No.: 436,006

[22] Filed: Oct. 22, 1982

[51] Int. Cl.[4] ............... F02K 1/08; F02K 1/09
[52] U.S. Cl. ............... 239/265.19; 239/265.31; 239/265.33; 60/271
[58] Field of Search ............ 60/228, 230, 232, 242, 60/271; 239/265.13, 265.19, 265.31, 265.33, 265.37

[56] References Cited

U.S. PATENT DOCUMENTS

| | | | |
|---|---|---|---|
| 2,952,124 | 9/1960 | Pearson | 239/265.13 |
| 3,824,784 | 7/1974 | Kitson et al. | 239/265.31 |
| 3,829,020 | 8/1974 | Stearns | 239/265.13 |
| 4,074,859 | 2/1978 | Lowman, Jr. | 60/230 |
| 4,196,856 | 4/1980 | James | 239/265.39 |
| 4,375,276 | 3/1983 | Konarski | 60/232 |

Primary Examiner—Stephen C. Bentley
Attorney, Agent, or Firm—Christensen, O'Connor, Johnson & Kindness

[57] ABSTRACT

A variable geometry gas turbine engine exhaust nozzle includes a variable circumference centerbody and a translating, annular shroud that cooperate to vary the throat area of the exhaust nozzle and the final area of the exhaust gas exiting the nozzle. The shroud includes a substantially constant inside diameter forward portion and a rear portion that has a continuously increasing inside diameter in the rearward direction. The centerbody is coaxially positioned within a circular cross section flow passage formed by the shroud and is configured with an upper and a lower shell that pivot between a retracted and an extended position. In the retracted position, the centerbody presents a circular profile to exhaust gases flowing through the exhaust nozzle. In the extended position, the centerbody presents an oval profile. By coordinating the centerbody shell position with the axial position of the shroud, the throat passage of the exhaust nozzle can be varied between an annular and a nonannular cross section. Additionally, since the shroud can be moved translationally independently of the configuration of the centerbody, the throat area of the exhaust nozzle and the final area of the exhaust gas can be varied independently of one another.

18 Claims, 5 Drawing Sheets

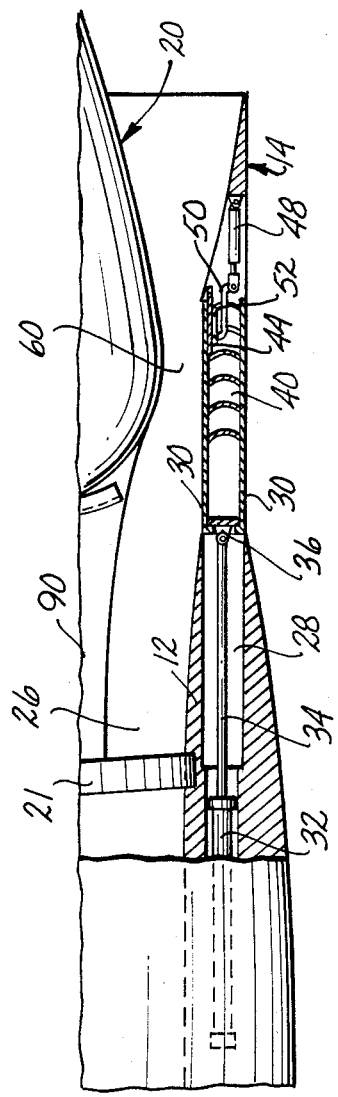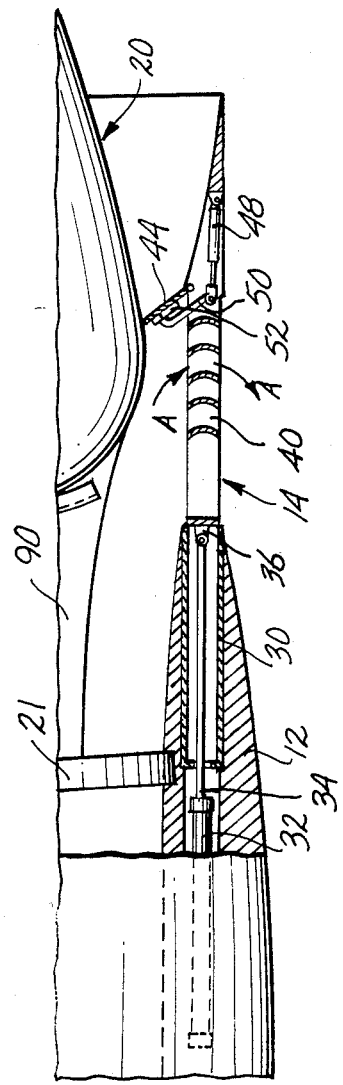

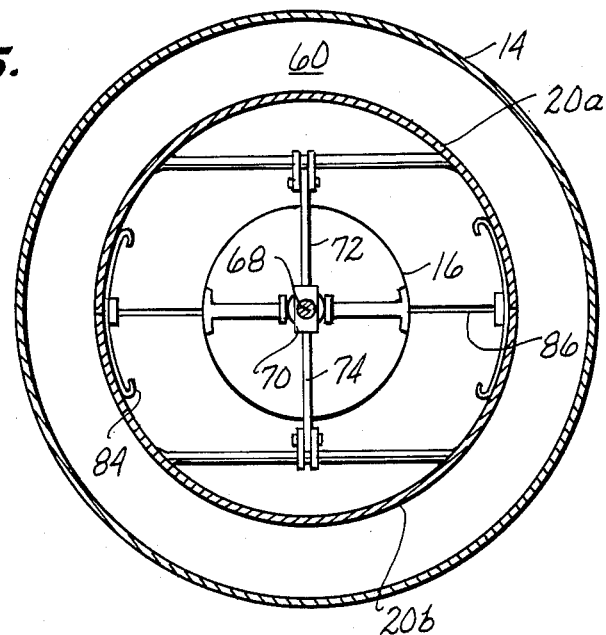
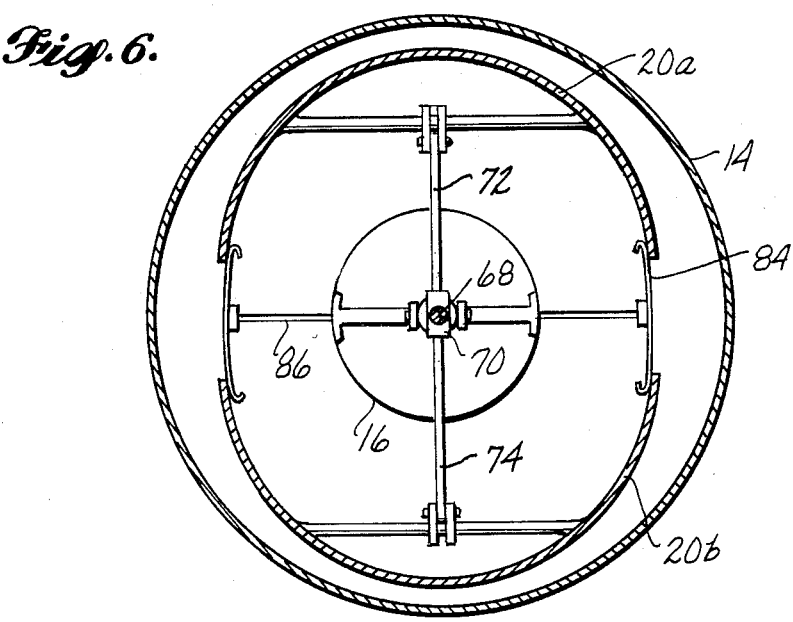

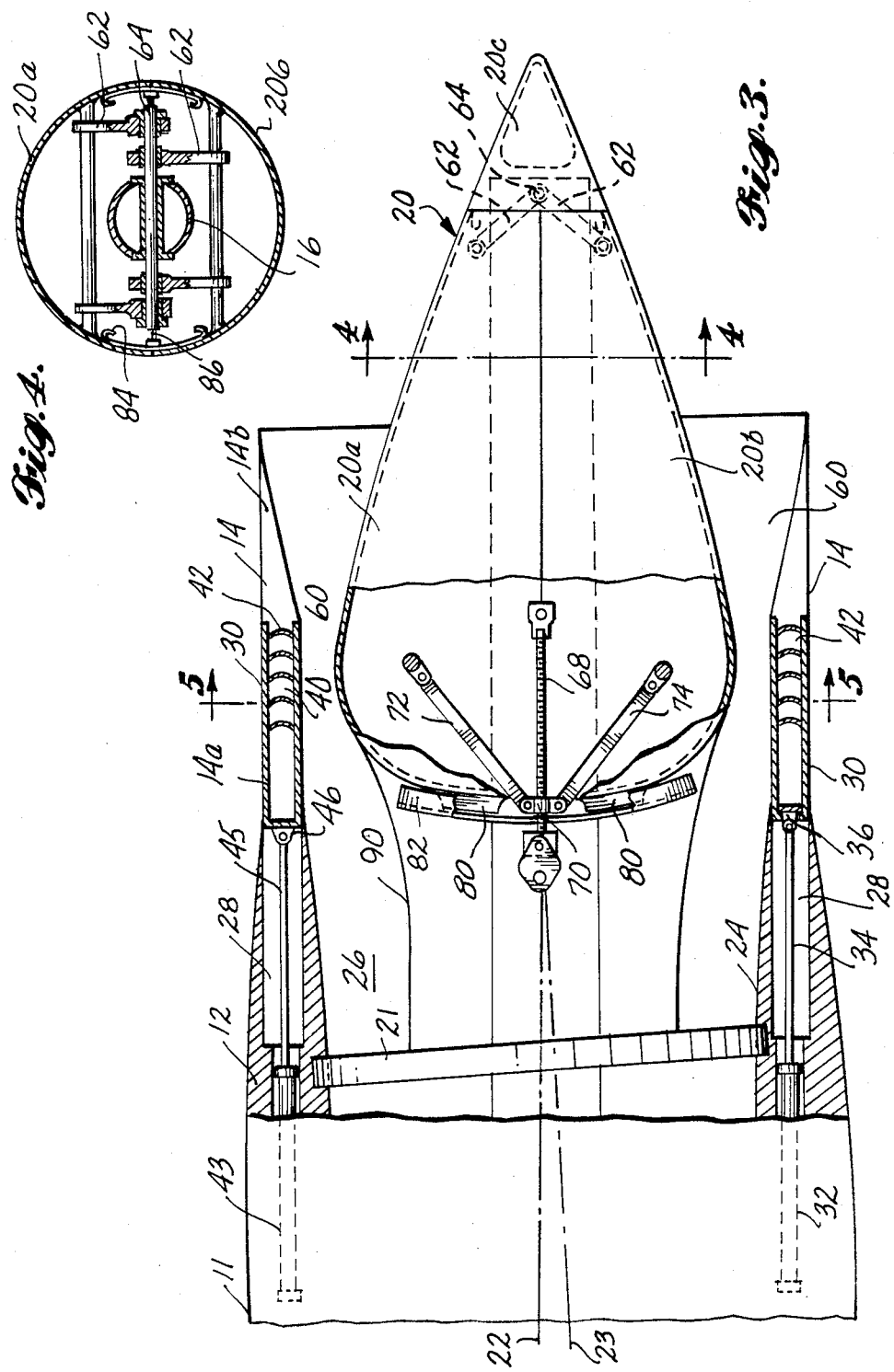

PLUG-TYPE EXHAUST NOZZLE HAVING A VARIABLE CENTERBODY AND TRANSLATING SHROUD

BACKGROUND OF THE INVENTION

This invention relates to exhaust nozzles for directing gas turbine exhaust gas into the atmosphere to propel an airplane or other vehicle. More particularly, this invention relates to a variable centerbody plug-type exhaust nozzle and translating shroud assembly for providing optimum thrust over a wide range of flight conditions, including operation of an aircraft at subsonic, transonic, and supersonic speeds.

It is known that maximum thrust and operating efficiency of a gas turbine engine that supplies propulsive thrust is obtained when the engine exhaust effluent is directed through an exhaust nozzle that controls the expansion of the exhaust gases. Controlled expansion of the high temperature, high pressure gases supplied by the gas turbine engine increases the particle velocity of the exhaust effluent and thereby increases the momentum of the thrust exhaust producing stream. In this respect, maximum operating efficiency is generally achieved when the nozzle is configured to exit the exhaust stream at substantially the same pressure as that of the surrounding atmosphere.

When an aircraft operates at subsonic, transonic, and supersonic speeds, the exhaust nozzle pressure ratio, i.e., the ratio of the total fluid pressure upstream of the nozzle to the ambient atmospheric pressure, varies over a substantial range. In particular, under subsonic flight conditions, the nozzle pressure ratio is sufficiently low that full expansion is not required, while under supersonic flight conditions, the nozzle pressure ratio is quite high and proper expansion of the exhaust effluent must be effected. Moreover, fairly substantial variations in pressure ratio results from various engine throttle settings, and in some cases, also results from "ram effect" when an increased amount of air is effectively forced through the engine as the aircraft moves through the atmosphere at high speeds.

One way of achieving good performance under the various flight modes is by using an exhaust nozzle having a variable throat area to allow the expansion ratio of the exhaust nozzle to vary as the pressure ratio varies, thereby maximizing engine performance. As known to those skilled in the art, the expansion ratio of an exhaust nozzle is the ratio of the final area of exhaust gas when the exhaust gas is at ambient atmospheric pressure to the area of the throat or smallest cross-sectional flow area in the exhaust nozzle. Accordingly, many attempts have been made to design variable geometry exhaust nozzles that are operable to vary the throat area of the exhaust nozzle and the final area of exhaust gas exiting the nozzle. Variation of the throat area can be achieved by changing the geometry of the inner, central center portion of an exhaust nozzle, while the final area of exhaust gas exiting the exhaust nozzle can be adjusted by varying the geometry of the outer housing of the exhaust nozzle.

Although various nozzle configurations have been proposed to accommodate the requirement for both a variable throat area and the capability of varying the final area of exhaust gas, such prior art nozzles have not simultaneously met all of the necessary design criteria. Nozzles such as convergent-divergent nozzles and variable cross section plug-type nozzles have been proposed. The fixed geometry convergent-divergent nozzle performs well at design conditions, but has a drawback of severe thrust losses at less than the design pressure ratio. On the other hand, variable cross section plug-type nozzles, such as the multiple-leaf plug-type nozzle, have been proposed due to their good flight performance and favorable reduced jet noise. However, a major problem with prior art multiple-leaf plug-type nozzles has been the mechanical complexity involved with variation of throat area. Additionally, while the multiple-leaf plug-type nozzle provides very good area control, the leaves tend to leak when the centerbody is pressurized internally with cooling air. Making the leaves stiff enough so that they will seal under load imposes too large of a weight penalty.

Another factor to be considered in the design of an exhaust nozzle for use on a supersonic aircraft is that some supersonic gas turbine engine applications restrict the amount of engine shroud perimeter available for placement of thrust reverser cascades. In such a situation, reverser cascade length must generally be increased to maintain adequate thrust reverser flow area. Such an increase in length is usually accompanied by an undesirable increase in weight.

Accordingly, it is an object of this invention to provide a variable centerbody plug-type exhaust nozzle and translating shroud assembly for use on a gas turbine engine, such exhaust nozzle being operable over the normal flight regime of a supersonic airplane.

It is another object of this invention to provide a variable geometry exhaust nozzle of the above-described type wherein the geometry of the rearwardly extending centerbody and the position of the translating shroud can be continuously varied, either independently or simultaneously, to provide a wide range of nozzle throat areas and final expansion areas.

It is still another object of this invention to provide a variable geometry exhaust nozzle of the above-described type wherein adequate thrust reverser flow area can be maintained without increasing the exhaust nozzle length, and while using a limited amount of engine shroud perimeter for targeting the exhaust gas to preferred locations.

It is yet another object of this invention to provide an exhaust nozzle of the above-described type that is relatively light in weight, containable within a region of relatively low volume, and has a relatively uncomplex structure to reduce weight, facilitate manufacture, and enhance reliability.

SUMMARY OF THE INVENTION

These and other objects are achieved in accordance with this invention by an exhaust nozzle wherein an annular nozzle housing is mountable to the aft end of a gas turbine engine and extends rearwardly therefrom. A shroud is slidably connected to the aft end of the nozzle housing so as to be slidable in an axial direction between a forwardmost position and a rearmost position. An inwardly facing surface of the shroud defines a flow passage for receiving the exhaust gases generated by the gas turbine engine and such surface includes a first portion adjacent the shroud's forward end configured to form a flow passage of substantially constant cross-sectional area. A second shroud surface portion axially extending from the rear of the first portion is configured to form a flow passage of increasing cross-sectional area in the aft, axial direction. A support tube is mounted to the aft end of the gas turbine engine and extends rearwardly therefrom, coaxially within the nozzle housing and the shroud. A variable circumference centerbody is axially mounted on the support tube within the flow passage of the shroud, forming a throat passage between the inner surface of the shroud and the centerbody.

The centerbody includes first and second shells that abut one another along a plane that is parallel to the nozzle axis when the centerbody is in the retracted position. The aft ends of the shells are pivotally attached to the support tube for pivotal movement of the forward ends of the shells away from one another into an extended position so as to vary the the cross-sectional area of the throat passage in cooperation with the translational movement of the shroud. The throat passage is configured to be at a minimum cross-sectional area when the shroud is translated to its aftmost position and the centerbody shells are in a retracted position, and the throat passage is at a maximum cross-sectional area when the shroud is translated to its forwardmost position and the centerbody shells are in the extended position. The centerbody may be extended in either shroud position to change throat area, independently of the final area of the exhaust gas.

In a preferred embodiment, the variable circumference centerbody has a teardrop shape when viewed in longitudinal section with an upper and a lower shell, and the pointed end of the centerbody directed rearwardly. The rearmost end of the centerbody has a pointed configuration to reduce aerodynamic drag. Additionally, the centerbody is configured to present a preferred circular cross section to the exhaust gases passing through the flow passage when the centerbody is in the retracted position. A nonannular throat area is produced when the centerbody is opened. The shroud thickness is such that the shroud can be adjusted to achieve the desired throat areas at subsonic and supersonic cruise with the centerbody in its retracted position. A gap formed between the shells when the centerbody is in the extended position is sealed by vertically oriented finger seals that press outwardly against the inner surface of the centerbody shells due to the higher internal pressure of cooling air within the centerbody. The finger seals are attached to the support tube by means of horizontal support brackets that extend radially outward from the support tube.

The centerbody shells are extended and retracted by means of a rotating screw shaft and associated nut collar that is mounted coaxially within the support tube. One end of each of a first and a second extension member is pivotally connected to the first and second shells, respectively. The other end of each of the extension members is pivotally connected to the nut collar. The extension members are configured so that as the nut collar moves back and forth along the screw shaft, the centerbody shells are pivotally extended and retracted.

To prevent horizontal, lateral movement of the centerbody shells, their forward ends are formed with two vertically extending guide bars that are spaced apart horizontally on either side of the support tube. Each of the guide bars on the first shell is vertically aligned with a guide bar on the second shell, and each pair of vertically aligned guide bars is contained within a vertically oriented guide track secured to the support tube.

In the preferred embodiment, the shroud has an annular shape, and thus, when the centerbody is in the retracted position for use at supersonic speeds, the throat passage formed between the inner surface of the shroud and the centerbody has an annular configuration. However, when the centerbody is in the extended position, the throat passage has a nonannular shape.

The shroud is also configured so that thrust reverser cascades are located within designated circumferential sections of the first surface portion of the shroud. To prevent the thrust reverser cascades from being exposed when the shroud is translated to its rearmost position an elongated shroud cover, of "C" shape in longitudinal section, is used to extend over the forward end of the shroud and cover both the inner and outer openings of the thrust reverser cascades. The shroud and shroud cover are configured to nest so that they can be jointly retracted into an annular groove that is located on the rear edge of the nozzle housing. The shroud and shroud cover can be moved independently so that when the thrust reverser cascades are to be used, the shroud can be translated rearwardly out of the annular groove while the shroud cover is kept in its retracted position, thereby exposing the thrust reverser cascades.

BRIEF DESCRIPTION OF THE DRAWINGS

A better understanding of the present invention can be obtained from the following specification which is to be read in conjunction with the accompanying drawings wherein:

FIG. 3 is a cross-sectional side elevation view of the exhaust nozzle with the upper and lower shells of the variable centerbody in the retracted position and the shroud moved into its rearmost position for use during supersonic flight conditions;

FIG. 4 is a cross-sectional view of the variable centerbody of FIG. 3 taken along section line 4—4 showing the pivoting mechanism of the upper and lower shells of the centerbody;

FIG. 5 is a cross-sectional view of the exhaust nozzle of FIG. 3 taken along section line 5—5 showing the actuation mechanism used to extend and retract the upper and lower shells of the centerbody with the centerbody and shroud positioned for use at supersonic cruise;

FIG. 6 is a cross-sectional view of the exhaust nozzle of FIG. 2 taken along section line 6—6 showing the actuation mechanism used to extend and retract the upper and lower shells of the centerbody and the centerbody and shroud positioned for use at takeoff;

FIG. 7 is an enlarged, partial cross-sectional view of the exhaust nozzle with both the shroud and shroud cover in the rearmost position;

FIG. 8 is an enlarged, partial cross-sectional view of the exhaust nozzle with the shroud in the rearmost position and the shroud cover in the forwardmost position to deploy the thrust reverser cascades and the blocker door actuated.

DETAILED DESCRIPTION

Figure 1:
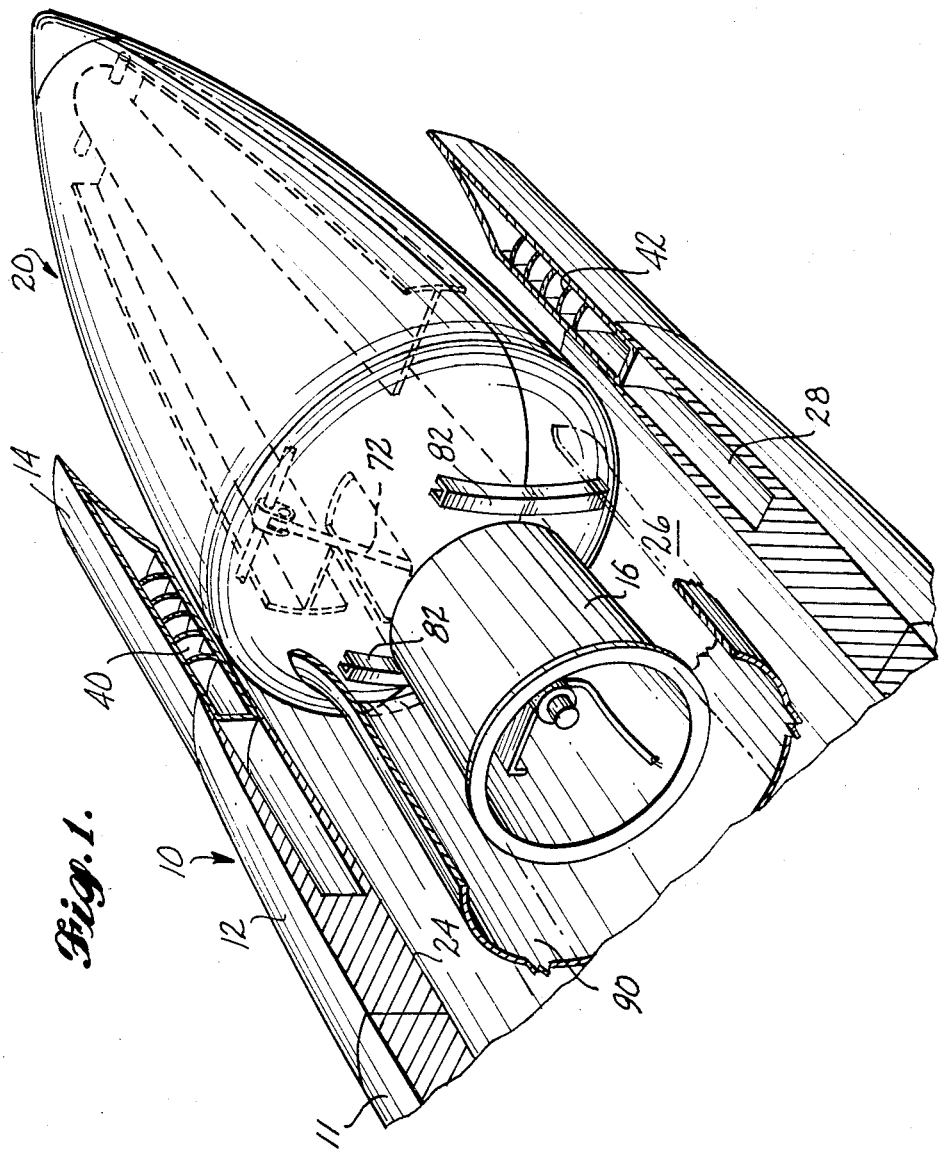
FIG. 1 is a cut-away perspective view of the exhaust nozzle with the centerbody in the retracted position and the shroud moved into its rearmost position.
Figure 2:
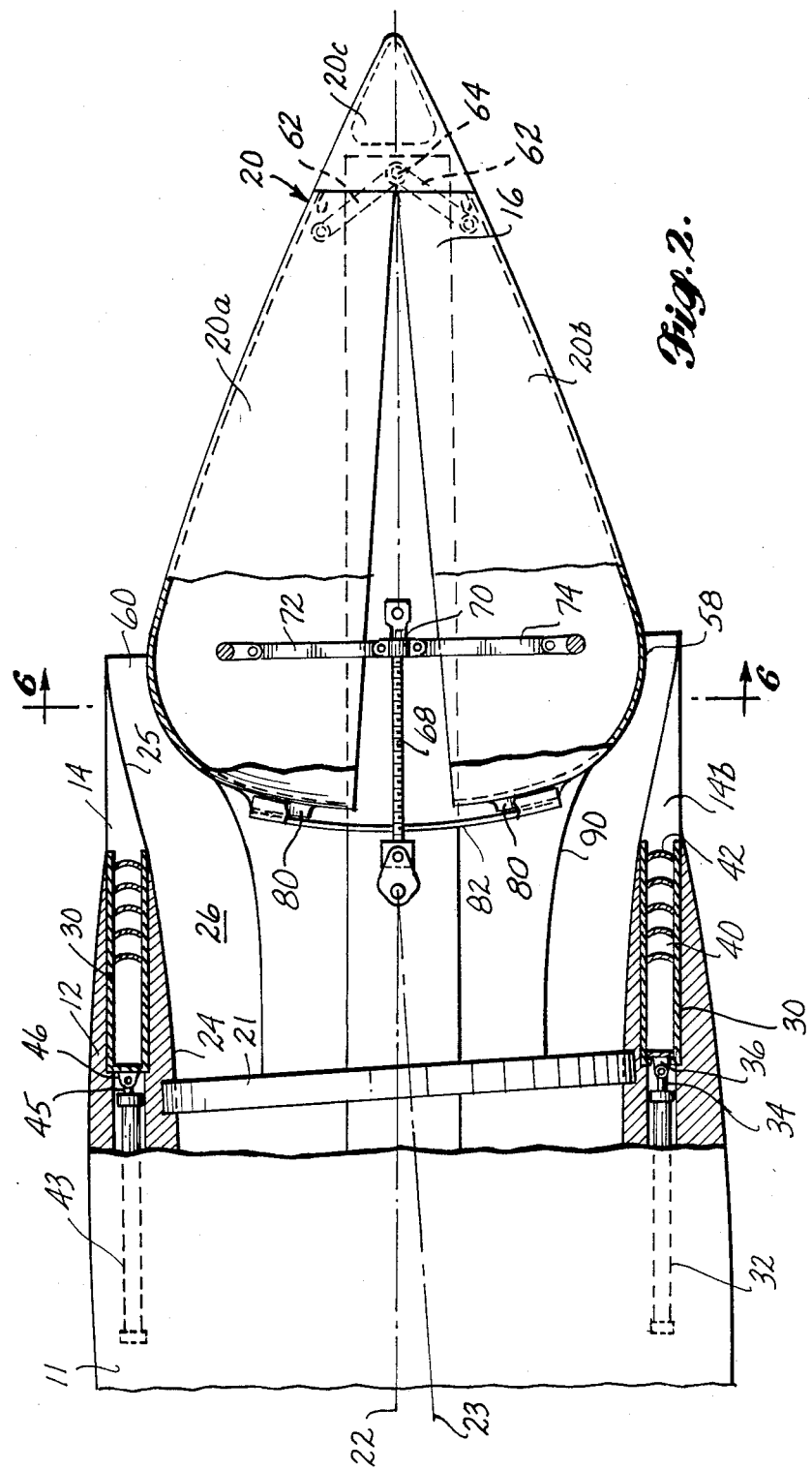
FIG. 2 is a cross-sectional side elevation view of the exhaust nozzle with the upper and lower shells of the variable centerbody in the extended position and the shroud in its forwardmost position as the exhaust nozzle would be configured for takeoff.

FIG. 1 depicts a variable throat area exhaust nozzle 10 for cooperating with a gas turbine engine, the nozzle receiving end of which is indicated at 11. The exhaust nozzle includes an annular nozzle housing 12 that is mounted to the end 11 of the turbine engine and an annular, axially translatable shroud 14 that is slidably mounted at the rear of the nozzle housing for coaxial movement relative to housing 12 between a forwardmost position and a rearmost position. Also attached to the aft end of the turbine engine is a support tube 16 that is positioned coaxially within the nozzle housing 12. The support tube 16 carries a teardrop shaped, variable cross section centerbody 20 adjacent the rear portion of the nozzle housing 12 that together with shroud 14 channels the exhaust gas flowing through the nozzle housing 12. The cross-sectional area of the centerbody 20 can be varied in cooperation with the axial position of the shroud 14 to achieve the proper expansion ratio for the exhaust gas for a given pressure ratio. Additionally, the centerbody 20 and shroud 14 are both configured to cooperatively provide a circular expansion zone at supersonic cruise speeds. Referring to FIGS. 2 and 3, the gas turbine engine terminates at an exhaust flange 21. The axial centerline 22 of exhaust nozzle 10 is shown skewed from centerline 23 of gas turbine engine 11 following conventional practice for the mounting of exhaust nozzles.

Looking at the exhaust nozzle 10 in more detail, it can be seen in FIGS. 1, 2, and 3 that the inner surface 24 of nozzle housing 12 and the inner surface 25 of shroud 14 form a flow passage 26 for receiving exhaust gases generated by the turbine engine. As most clearly shown in FIG. 3, a rearwardly opening annular groove 28 is located in the rear portion of nozzle housing 12 to receive annular shroud 14 and an annular shroud cover 30, which will be described in more detail later.

Also shown in FIGS. 2 and 3 are conventional linear actuators 32 that are mounted forward of annular groove 28 and oriented parallel to axial centerline 22 for moving the shroud 14 between the forwardmost and rearmost positions. As shown in the Figures, the actuators 32 are located between the inner and outer surfaces of the nozzle housing 12, so they are not directly exposed to hot exhaust gases. However, since actuators 32 must operate in a high temperature environment, they are preferably pneumatically operated. The interconnection between the actuator 32 and the shroud 14 is by an actuator rod 34 that is attached to the forward end of shroud 14 by means of a clevis 36 or some other conventional method of connection.

In a preferred embodiment, the shroud 14 is a single unit so that the shroud translates as a whole when the actuators 32 are energized. In this embodiment, synchronous actuators 32 used to move the shroud 14 are spaced circumferentially around the nozzle housing 12 so that the force imparted to the shroud for translational movement is applied evenly to the shroud. Bending moments produced in shroud 14 due to the shroud overhang and impact loads, e.g., landings, are retracted to by actuators 32, which transfer tensile and compressive loads to the nozzle housing. Nozzle housing 12 reacts directly to radial loads imposed by the shroud.

Still referring to FIGS. 2 and 3 a transverse, cross-sectional view of shroud 14 discloses that the shroud has a forward portion 14a and a rear portion 14b. The forward portion 14a of the shroud 14 includes thrust reverser cascades 40 at selected circumferential locations. The thrust reverser cascades will be described in more detail later. The inside diameter of the forward portion of the shroud is substantially constant for the length of the forward portion. The rear portion 14b of the shroud 14 is contiguous with the forward portion and has a continuously increasing inside diameter from adjacent the forward portion 14a rearward to the rear edge of the shroud 14. When viewed in a transverse cross-section, the inner surface of rear portion 14b has a concave form to provide an increasing inside diameter rearwardly, while the transition area between forward portion 14a and rear portion 14b has a slightly convex configuration to minimize flow separation of exhaust gases flowing from the forward portion to the rear portion. The varying inside diameter of the shroud, together with its translational capability, cooperates with the variable cross-sectional area of centerbody 20 to vary the throat area of the exhaust nozzle.

As mentioned previously, incorporated within designated circumferential portions of shroud 14 are the thrust reverser cascades 40. The thrust reverser cascades utilize approximately 50 percent of the shroud perimeter in the preferred embodiment, since, as known to those skilled in the art, not all of the shroud perimeter is available for thrust reverser use due to problems of reingestion by the turbine engine and creation of unwanted lift when the thrust reversers are actuated. In the present embodiment, the thrust reverser cascades 40 are conventionally constructed with curved divertors 42 arranged in longitudinally oriented rows or cascades. The thrust reverser cascades 40 are positioned within shroud 14 so that when the shroud is in the forwardmost position, the thrust reverser cascades 40 are positioned within the annular groove 28. When the thrust reverser cascades 40 are to be used, e.g., during landings, shroud 14 is moved to the rearmost position.

Looking at FIGS. 3 and 7, it can be seen that the shroud cover 30, mentioned previously, has an elongated "C"-shape in longitudinal section and is configured to cover the reverser cascades 40 when shroud 14 is in the rearmost position and the thrust reverser is not being used. The shroud cover 30 is preferably an annularly shaped, one-piece member that translates between a forwardmost and a rearmost position independently of shroud 14. The shroud cover is moved translationally by means of linear actuators 43 that are spaced circumferentially from and mounted parallel to the actuators 32 used to extend and retract the shroud 14. The ends of rods 45 of linear actuators 43 are connected to the forwardmost end of shroud cover 30 by clevises 46. When the shroud cover 30 and shroud 14 are both in the forwardmost position, the shroud is nested within the shroud cover, and both members are positioned within groove 28. The length of thrust reverser cascades 40 is shorter than the distance of translational movement necessary to position the shroud in its rearmost position due to the combination of the translation of shroud 14 and thrust reverser cascades 40 with the translation of shroud cover 30. By using a translating shroud cover, the distance of translation of the shroud to expose sufficient thrust reverser flow area is less than if a translating shroud cover were not used. Thus, the thrust reverser cascade length adds no additional length to the exhaust nozzle.

As shown in FIGS. 7 and 8, a plurality of thrust reverser blocker doors 44 are pivotally mounted on the shroud 14 in a circumferential row that is aligned with the rearmost end of each thrust reverser cascade 40. In its retracted position as in FIG. 7, i.e., when the thrust reverser is not being used, blocker doors 44 lay flush with the inner surface of shroud 14 beneath shroud cover 30. When actuated as in FIG. 8, the blocker doors pivot inwardly about their rearmost ends so that the forward ends of the blocker doors travel through an arcuate path until they contact the surface of centerbody 20. With the blocker doors 44 in the extended position in contact with the centerbody 20, exhaust gases that are flowing rearwardly through the flow passage 26 are diverted by the blocker doors to flow outwardly through thrust reverser cascades 40 as indicated by the arrows marked with the letter A.

The blocker doors 44 may be actuated by any conventional means. For example, as shown in FIG. 8, the rod of an actuator 48 is connected to one end of a lever arm 50 that is pivotally mounted to an inner portion of shroud 14. The other end of the lever arm is slidably attached to a slide bar 52 mounted on the lower surface of blocker door 44. When the blocker door 44 is to be raised, the rod of actuator 48 is extended, urging the lever arm 50 to pivot and force the blocker door to pivot upwardly.

As mentioned before, and shown in FIG. 1, the forward end of the support tube 16 is attached to the nozzle receiving end 11 of the turbine engine with the support tube mounted concentrically about the exhaust nozzle axial centerline 22. The rearmost end of the support tube 16 extends axially beyond the rear edge of the shroud 14 when the shroud is in its rearmost position. Support tube 16 is a hollow, cylindrically shaped tube that carries cooling air to the centerbody 20 in addition to containing a portion of the mechanism used to vary the cross-sectional area of the centerbody 20, which will be described in more detail later. The support tube 16 is also used to support and position the centerbody 20 concentrically about axial centerline 22.

As shown in FIGS. 1, 2, and 3, centerbody 20 is mounted on the aft portion of the support tube 16, with the forward end of the centerbody 20 approximately aligned with the rear edge of the nozzle housing 12. The centerbody 20 generally has a teardrop shape with the larger diameter end of the centerbody oriented toward the front of the exhaust nozzle 10. The rearmost end of the centerbody 20 converges to form a pointed end. In the preferred embodiment, the centerbody 20 is configured from an upper shell 20a, a lower shell 20b, and a rear, cone-shaped section 20c. The crown 58 or line of largest circumference of the upper and lower shells 20a and 20b of centerbody 20 is axially positioned so that it is approximately aligned with the rearmost edge of shroud 14 when the shroud is in its forwardmost position. The upper and lower shells 20a and 20b pivot away from one another in a vertical direction from a retracted position into an extended position. As shown in FIG. 5, when in the retracted position, the centerbody 20 presents a circular cross section to the exhaust gases in the flow passage 26, thus, an annularly shaped throat passage 60 is formed between the crown of the centerbody 20 and the inner surface 25 of the shroud 14. As shown in FIG. 6, when the upper and lower sections pivot away from one another into the extended position, the centerbody 20 presents an oval cross section in the flow passage 26 that is symmetric about a longitudinal, vertical plane through the exhaust nozzle 10 with the throat passage being nonannualar.

Referring now to FIG. 4, the aft ends of the centerbody upper and lower shells 20a and 20b pivot about a horizontal axis through the aft end of the support tube 16. Pivot arms 62 are formed on the inner surface of the upper and lower shells of the centerbody, and are pivotally attached to a crossbar 64 that extends horizontally from the support tube 16 adjacent its aft end. The aft ends of the upper and lower shells of the centerbody 20 abut the forward end of the cone-shaped section 20c, which is rigidly mounted to the aft end of the support tube 16.

Pivotal movement of the centerbody upper and lower shells 20a and 20b is achieved by means of a rotating screw shaft 68 and a nut collar 70 that is mounted on the screw shaft. The screw shaft is mounted coaxially within the support tube 16, and is preferably rotated by a pneumatic motor (not shown) because of the high temperature of the working environment, though other conventional means may be used. As the shaft rotates, the nut collar moves axially along the screw shaft. A first extension member 72 has its inner end pivotally connected to the upper side of the nut collar 70 and its outer end pivotally connected to the upper shell 20a. A second extension member 74 is likewise pivotally connected to the lower side of the nut collar 70 and the centerbody lower shell 20b. The extension members 72 and 74 are configured so that when nut collar 70 is at the forward end of screw shaft 68, the centerbody upper and lower shells 20a and 20b are in the abutting or retracted position with the first extension member 72 angled upwardly and rearwardly and the second extension member 74 angled downwardly and rearwardly. When the nut collar 70 is moved to the aft end of the screw shaft 68, the upper and lower shells are separated into the extended position with both extension members 72 and 74 positioned vertically.

As shown in FIGS. 2 and 3, two vertically oriented guide bars 80 are formed in the forward end of each of the centerbody upper and lower shells 20a and 20b, respectively. The two guide bars 80 on each of the shells are horizontally spaced from one another so that they are positioned on each side of the support tube 16. Each of the guide bars on the centerbody lower shell 20b are positioned in vertical alignment with a guide bar on the upper shell 20a so that a pair of vertically aligned guide bars can be contained within guide tracks 82 that are attached to opposing, lateral sides of the support tube 16 as shown in FIG. 1. The guide bars 80 and guide tracks 82 cooperate to prevent horizontal movement of the centerbody upper and lower shells 20a and 20b as the shells move with respect to one another.

When the centerbody upper and lower shells 20a and 20b pivot away from one another, a gap is created between the edges of the sidewalls of the shells. As illustrated in FIG. 6, the gap is closed by two rows of vertically oriented, flexible finger seals 84 on each side of the support tube 16 that prevents leakage of the higher pressure cooling air within the centerbody 20. The finger seals 84 are mounted at the outer end of horizontally oriented support plates 86 that extend from diametrically opposed sides of the portion of the support tube 16 within the centerbody 20. As shown in FIG. 5, when the centerbody shells abut in the retracted position, the finger seals 84 flex inwardly and rest against the inner surface of the centerbody 20. In the preferred embodiment, the seals 84 are formed from thin sections of high temperature steel.

As shown in FIGS. 2 and 3, a tubularly shaped fairing 90 covers the forward portion of the support tube 16 and extends coaxially over the support tube 16 between the rear of the turbine engine and the forward end of centerbody 20. The fairing 90 is outwardly flared at its aft end to cover the guide tracks 82 and form an aerodynamically smooth transition area at the forward end of centerbody 20. In the preferred embodiment, the fairing 90 is a fixed structure, though in an alternate embodiment, the aft end of the fairing 90 could be made to have a flexible flared area to allow the fairing to follow the movement of the centerbody shells and thereby further improve the aerodynamic characteristics of the transition area at the forward end of the centerbody 20.

Operation

During operation of the aircraft at speeds below mach 1.0, the expansion ratio of the exhaust nozzle 10 is kept at approximately 1.0 due to the pressure ratio experienced by the turbine engine at subsonic speeds. This is accomplished by keeping the shroud in the forwardmost position. In the preferred embodiment, the proper throat area is obtained at takeoff by opening the centerbody 20 into its fully extended position as shown in FIGS. 2 and 6, thus forming a throat passage 60 having a nonannular configuration. While a nonannular throat passage results in higher fuel consumption, it is tolerable for short duration conditions such as takeoff and climbout because the major fuel consuming legs of a flight are subsonic and supersonic cruise, where the throat passage has an annular, fully symmetric shape. To extend the centerbody 20 shells, the screw shaft 68 is rotated, causing the nut collar 70 to travel to the rearmost end of the shaft. As the nut collar 70 travels rearwardly, the outer ends of the first and second extension members 72 and 74 are moved outwardly causing the centerbody upper and lower shells 20a and 20b to pivot outwardly. As the forward ends of the upper and lower shells pivot apart, the finger seals 84 seal the gap between the edges of the upper and lower shells by pressing outwardly against the inner surface of the centerbody 20 adjacent the gap between the centerbody shells.

As the aircraft speed increases to approximately mach 0.9, the expansion ratio of the exhaust nozzle remains at approximately 1.0, however, the throat area is changed from the takeoff configuration by retracting the centerbody shells 20a and 20b. At subsonic cruise of approximately mach 0.9, the shroud 14 can be translated aft a fraction of its full travel to provide a small amount of expansion ratio as required for optimum performance.

As the aircraft's speed exceeds mach 0.9, the expansion ratio of the exhaust nozzle 10 is increased to match the increasing pressure ratio experienced by the turbine engine and thereby maximize turbine engine performance. The expansion ratio is increased by translating shroud 14 aft. Throat area is adjusted as needed by adjustment of the centerbody position. At full supersonic cruise, shroud 14 is moved completely rearwardly and the centerbody 20 is in its retracted position as shown in FIGS. 3 and 5. This configuration gives an expansion zone of the exhaust nozzle that is annular and completely symmetric, thus minimizing the wetted area within the throat passage 60 to maximize engine performance, and also produce a uniform expansion ratio pattern. When the shroud 14 is in its rearmost position during supersonic cruise, the shroud cover 30 is also in its rearmost position, covering the thrust reverser cascades 40.

During landings, when reverse thrust is needed, the shroud 14 is moved to its rearmost position while the centerbody 20 is in the retracted position. When the shroud 14 is translated rearwardly for landings, the shroud cover 30 is kept in its forwardmost position within the annular groove 28 in the nozzle housing 12 to expose the thrust reverser cascades 40. When the shroud 14 is in its rearmost position, the blocker doors 44 are actuated to pivot inwardly and contact the centerbody 20. The actuated blocker doors thus obstruct the throat passage 60 formed between the inner surface of the shroud 14 and the surface of centerbody 20 to divert exhaust gases from the turbine engine out through the thrust reverser cascades 40.

Any nozzle which is designed for supersonic flight speeds represents a compromise of performance, weight, and drag. The relatively simple two-piece centerbody, the relatively short shroud translation, and mounting the shroud from an annular surrounding nozzle housing all contribute to significant weight savings with no loss in performance at key flight conditions.

The present invention has been described in relation to a preferred embodiment and variations upon that embodiment. One of ordinary skill after reading the foregoing specification will be able to effect various changes, alterations, and substitutions of equivalents without departing from the broad concepts disclosed. It is therefore intended that the scope of Letters Patent granted hereon be limited only by the definitions contained in the appended claims and equivalents thereof.

The embodiments of the invention in which an exclusive property or privilege is claimed are defined as follows:

1. An exhaust nozzle for containing and directing the flow of exhaust gases generated by a gas turbine engine, comprising:

an annular nozzle housing mountable to the aft end of said gas turbine engine so as to extend rearwardly therefrom;

an annular shroud coaxially mounted to the aft end of said nozzle housing for axial sliding movement relative to said housing, said shroud being movable along a translational path between a forwardmost position and a rearmost position, said shroud having an inwardly facing surface for defining a flow passage for receiving said exhaust gases generated by said gas turbine, a first portion of said inwardly facing surface adjacent a forward end of said shroud being configured to form a flow passage of constant cross-sectional area, and a second portion of said inwardly facing surface adjacent said first portion configured to form a flow passage of increasing cross-sectional area in the aft, axial direction;

a support tube mountable to the aft end of said gas turbine to extend rearwardly therefrom, said support tube being mounted coaxially within said nozzle housing and said shroud; and a variable circumference centerbody axially mounted on said support tube within said flow passage of said shroud forming a throat passage between said inner surface of said shroud and said centerbody, said centerbody including a first shell and a second shell, said first and second shells each having a forward end and an aft end, the edges of said first and said second shells abutting one another along a plane that is parallel to the central axis of the exhaust nozzle when said shells are in a retracted position, the aft ends of said first and said second shells being pivotally attached to said support tube for pivotal movement of the forward ends of said shells away from one another into an extended position, said first and said second shells being configured to vary the cross-sectional flow are of said throat passage by cooperation between the pivotal movement of said shells and the translational movement of said shroud, said variable centerbody being positioned axially within said shroud to be adjacent said first and said second portions of said inwardly facing surface of said shroud when said shroud is moved axially, said throat passage being at a minimum area when said shroud is translated to its rearmost position and said centerbody is in retracted position, and said throat passage being at a maximum area when said shroud is translated to its forwardmost position and said centerbody is in an extended position.

2. The exhaust nozzle of claim 1, wherein said centerbody has a teardrop shape when viewed in longitudinal section, said centerbody having a first end and a second end, said second end having a pointed configuration and being oriented toward the rear of said exhaust nozzle, said centerbody presenting a circular cross-sectional area to exhaust gases flowing through said flow passage when said first and said second shells are in a retracted position, said centerbody presenting an oval cross-sectional area to exhaust gases flowing through said flow passage when said first and said second shells are in an extended position.

3. The exhaust nozzle of claim 2, wherein said first and said second shells are arranged so that said plane along which said shells abut is oriented horizontally with respect to said exhaust nozzle.

4. The exhaust of claims 1, 2, or 3 further comprising:
a plurality of finger seals connected to said support tube, said finger seals configured and arranged to simultaneously contact said first and said second shells and seal said centerbody from said flow passage.

5. The exhaust nozzle of claim 4, wherein said shroud includes a thrust reverser cascades, said thrust reverser cascades being spaced radially from the central axis of said shroud, and said thrust reverser cascades passing through said first portion of said inwardly facing surface of said shroud to an outer surface of said shroud.

6. The exhaust nozzle of claim 5, further comprising:
a shroud cover mounted to said nozzle housing for axial sliding movement relative to said housing, said shroud cover being movable between a forwardmost position and a rearmost position, said shroud cover configured and arranged for independent translational movement along a translational path that is coextensive with the translational path followed by said shroud, said shroud cover configured to overlay said thrust reverser cascades when said shroud and said cover are both in the forwardmost axial position and when said shroud and said shroud cover are both in the rearmost position, said cover configured to expose said thrust reverser slots when said shroud is in its rearmost axial position and said shroud cover is in its forwardmost axial position.

7. The exhaust nozzle of claim 6, wherein said shroud and said shroud cover fit within a rearwardly opening annular groove at the aft end of said nozzle housing.

8. The exhaust nozzle of claim 7, further comprising:
linear actuator means for moving said shroud between said forwardmost and said rearmost positions and for transferring tensile and compressive forces generated by bending moments within said shroud from said shroud to said nozzle housing.

9. The exhaust nozzle of claim 8 further comprising:
means for moving said shroud cover between said forwardmost and said rearmost positions.

10. The exhaust nozzle of claim 9, further comprising:
a guide track mounted on said support tube; and
a guide member mounted on each of said first and said second shells of said centerbody, said guide members cooperating with said guide track to permit movement of said first and said second shells in an aligned manner.

11. An exhaust nozzle for containing and directing the flow of exhaust gases generated by a gas turbine engine comprising:
a nozzle housing mountable to the aft end of said gas turbine engine so as to extend rearwardly therefrom, said nozzle housing having an inwardly facing annular surface for defining a flow passage for receiving said exhaust gases generated by said gas turbine engine;
a support tube mountable to the aft end of said gas turbine to extend rearwardly therefrom, said support tube being mounted coaxially within said nozzle housing; and
a variable circumference centerbody axially mounted on said support tube within said flow passage of said nozzle housing forming a throat passage between said inner surface of said nozzle housing and said centerbody, said centerbody including a first shell and a second shell, said first and said second shells each having a forward end and an aft end, the edge of said first and said second shells abutting one another along a plane that is parallel to the central axis of the exhaust nozzle when said shells are in a retracted position, the aft ends of said first and said second shells being pivotally connected to said support tube for pivotal movement of the forward ends of said shells away from one another into an extended position, said first and said second shells being configured to vary the cross-sectional flow area of said throat passage by pivoting said first and said second shells between said retracted and said extended positions, said throat passage having a minimum cross-sectional flow area when said centerbody is in an extended position and said throat passage having a maximum cross-sectional flow area when said centerbody is in a retracted position.

12. The exhaust nozzle of claim 11, wherein said centerbody has a teardrop shape when viewed in longitudinal section, said centerbody having a first end and a second end, said second end having a pointed configuration and being oriented toward the rear of said exhaust nozzle, said centerbody presenting a circular cross-sectional area to exhaust gases flowing through said flow passage when said first and said second shells are in a retracted position, said centerbody presenting an oval cross-sectional area to exhaust gases flowing through said flow passage when said first and said second shells are in an extended position.

13. The exhaust nozzle of claim 12, wherein said first and said second shells are arranged so that said plane along which said shells abut is oriented horizontally with respect to said exhaust nozzle.

14. The exhaust nozzle of claim 13, further comprising:
a plurality of finger seals connected to said support tube, said finger seals configured and arranged to simultaneously contact said first and said second shells and seal said centerbody from said throat passage.

15. The exhaust nozzle of claim 14, further comprising:
a guide track mounted on said support tube; and
a guide member mounted on each of said first and said second shells of said centerbody, said guide members cooperating with said guide track to permit movement of said first and said second shells in an aligned manner.

16. An exhaust nozzle for containing and directing the flow of exhaust gases generated by a gas turbine engine, comprising:
an annular nozzle housing mountable to the aft end of said gas turbine engine so as to extend rearwardly therefrom;
an annular shroud coaxially mounted to the aft end of said nozzle housing for axial sliding movement relative to said housing, said shroud being movable along a translational path between a forwardmost position and a rearmost position, said shroud having an inwardly facing surface for defining a flow passage for receiving said exhaust gases generated by said gas turbine, a first portion of said inwardly facing surface adjacent a forward end of said shroud being configured to form a flow passage of substantially constant cross-sectional area, and a second portion of said inwardly facing surface adjacent said first portion configured to form a flow passage of increasing cross-sectional area in the aft, axial direction;
linear actuator means for moving said shroud between said forwardmost and said rearmost positions and for transferring tensile and compressive forces caused by bending moments within said shroud from said shroud to said nozzle housing; and,
centerbody means for forming a throat passage within said flow passage of said shroud, said throat passage having a cross-sectional flow area;
means for moving a circumference of said centerbody to vary said cross-sectional flow area;
said shroud coacting with said centerbody means so that said cross-sectional flow area varies as a result of combined movements of said shroud between said forwardmost and said rearmost positions and said centerbody circumference.

17. The exhaust nozzle of claim 16, wherein said shroud includes a thrust reverser cascade passing through said first portion of said inwardly facing surface of said shroud to an outer surface of said shroud, said shroud including blocker door means for obstructing said flow passage formed by said shroud.

18. The exhaust nozzle of claim 17 further comprising:
a shroud cover mounted to said nozzle housing for axial sliding movement relative to said housing, said shroud cover being movable between a forwardmost position and a rearmost position, said shroud cover arranged for independent translational movement along a translational path that is coextensive with the translational path followed by said shroud, said shroud cover being configured to overlay said thrust reverser cascade when said shroud and said shroud cover are both in the forwardmost position and when said shroud and said shroud cover are both in the rearmost position, said shroud cover being configured to expose said thrust reverser cascade when said shroud is in the rearmost position and said shroud cover is in the forwardmost position; and,
means for moving said shroud cover between said forwardmost and said rearmost positions.

* * * * *

UNITED STATES PATENT AND TRADEMARK OFFICE
CERTIFICATE OF CORRECTION

PATENT NO. : 4,802,629

DATED : February 7, 1989

INVENTOR(S) : Garry W. Klees

It is certified that error appears in the above-identified patent and that said Letters Patent is hereby corrected as shown below:

Column 10, line 67: "are" should be --area--

Signed and Sealed this

Nineteenth Day of September, 1989

Attest:

DONALD J. QUIGG

Attesting Officer

Commissioner of Patents and Trademarks